United States Patent [19]

Brennan et al.

[11] 4,378,481
[45] Mar. 29, 1983

[54] BACKERS HAVING GLASS PARTICULATES FOR ELECTRON BEAM HOLE DRILLING

[75] Inventors: John J. Brennan, Portland, Conn.; Lester W. Jordan, Cranston, R.I.

[73] Assignee: United Technologies Corporation, Hartford, Conn.

[21] Appl. No.: 239,276

[22] Filed: Mar. 2, 1981

[51] Int. Cl.³ .............................................. B23K 15/00
[52] U.S. Cl. ................................................. 219/121 EH
[58] Field of Search ................ 219/121 LK, 121 LL, 219/121 LM, 121 L, 121 EH, 121 EM, 121 EB; 252/518, 521; 524/492; 501/17, 20, 35, 54, 64; 106/84

[56] References Cited

U.S. PATENT DOCUMENTS

| | | | |
|---|---|---|---|
| 3,527,649 | 9/1970 | Sullivan | 501/17 |
| 3,649,806 | 3/1972 | Konig | 219/121 |
| 4,147,835 | 4/1979 | Nishino et al. | 501/17 X |
| 4,156,807 | 5/1979 | Howard et al. | 219/121 |
| 4,193,808 | 3/1980 | Khodsky et al. | 501/17 X |
| 4,239,954 | 12/1980 | Howard et al. | 219/121 |
| 4,273,822 | 6/1981 | Bube | 106/53 X |

FOREIGN PATENT DOCUMENTS 1145611  2/1969  United Kingdom .

*Primary Examiner*—C. L. Albritton
*Attorney, Agent, or Firm*—Charles G. Nessler

[57] ABSTRACT

Backers for electron beam hole drilling contain glass particulates with a binder. For nickel base alloys, the glass particulates have at least 7 weight percent low temperature constituent, with a melting point less than 1500° C., and a balance of high temperature constituent having a vaporization point of greater than 2000° C. at 1 atmosphere. Softening points of the glasses exceed 700° C. and preferably are in the range 800°–1000° C. A useful glass will have a viscosity of at least about 10 Pa·s when it melts. More preferred silicate glasses contain by weight percent at least $8Al_2O_3$, $9CaO$, and $3B_2O_3$.

10 Claims, 6 Drawing Figures

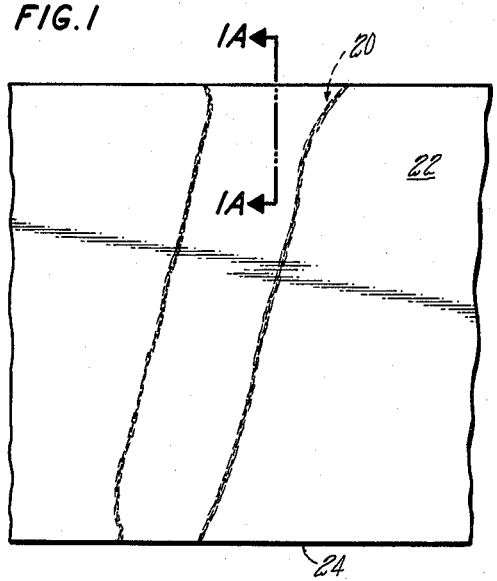
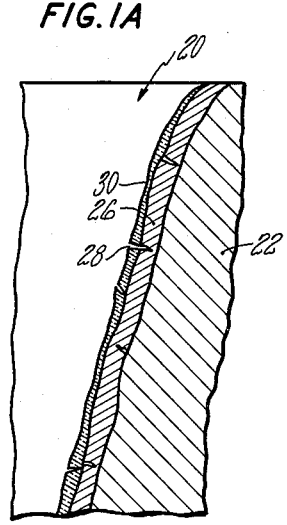
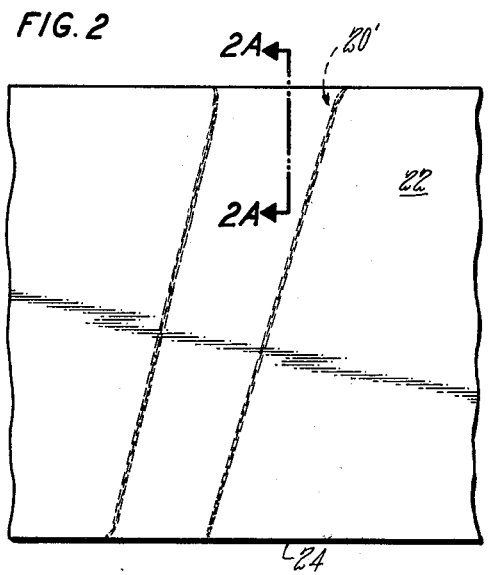
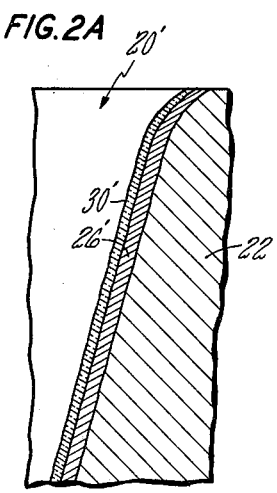

BACKERS HAVING GLASS PARTICULATES FOR ELECTRON BEAM HOLE DRILLING

DESCRIPTION

TECHNICAL FIELD

This invention relates to backers for electron beam drilling, most particularly to the characteristics of the ceramic particulate which is included therein.

BACKGROUND ART

In electron beam drilling a material, called a backer, is required at the surface of the workpiece facing away from the beam source. In the absence of a backer a beam penetrating the exit surface may hit another surface of the workpiece, and more importantly, a hole drilled through the workpiece will be poorly shaped. The backer has the dual function of absorbing or dissipating excess electron beam energy and generating gaseous pressure when hit by the beam. The pressure must be sufficient to expel molten workpiece material from the hole being drilled in a direction opposite to that from which the beam comes; this action will produce a well shaped symmetrical hole.

For high performance applications it is not enough that the hole be well-formed; it is also necessary that there be a minimum thickness recast, or melted and resolidified, layer of metal which is typically found along the bore of the hole. It is also desired that there be a minimum of backer residue in the hole, since this may be hard to remove and undesired in actual use because of its properties.

The dual requirements of durability under beam action (to protect other portions of the workpiece or fixture) and controlled degeneration (to provide the necessary gaseous force) require that backer compositions be carefully chosen. Koenig, U.S. Pat. No. 3,649,806 describes a preformed metal and ceramic cellular structure backer containing volatile materials. U.S. Pat. No. 4,239,954 of Howard, Jordan and Yaworsky, (of common assignee herewith) entitled "Backer for Electron Beam Hole Drilling" discloses backers generally having ceramic particulates contained in a liquifiable binder; the disclosure thereof is hereby incorporated by reference. The particulates which are mentioned as useful include metal alloys, fine glass bead, glass frit, fused silica and alumina, calcia, magnesia, silica and zirconia powders. Soda lime glass is exemplified as being particularly useful. Binders which are disclosed include sodium silicate, silicone rubber, epoxy resins, waxes and polyvinyl alcohol.

The present invention is concerned with novel particulates which are includable in the backer. Previously, it was recognized that the backer had to have certain characteristics, namely the volatility and durability mentioned above, but it was not apparent how these characteristics were most desirably produced by the separate contributions of the particulate and binder. As the above mentioned U.S. Pat. No. 4,239,954 indicates, the properties of the binder are often times largely determined by the ease with which the backer may be applied and removed from the workpiece. A number of particulate materials have been stated as being useful in the prior art but not much distinction was made between there different particulates. Metal particulates are noted as being usable in the prior art, but generally the ceramic materials are preferred because of lower cost, their relative inertness, and their refractory properties insofar as stopping the beam. But, there is no technical teaching in the prior art to enable a choice among the ceramics. Glass of the soda lime type is preferred mainly because of its common availability and low cost. The characteristics of particulates have now been investigated more fully and have resulted in the discovery of very useful glass particulates which are claimed herein. The invention herein has relation to J. Brennan's application Ser. No. 239,275, "Alkali Metal Oxide Free Backers for Energy Beam Drilling" filed on even date hereof.

DISCLOSURE OF INVENTION

An object of the invention is to provide a backer which is most effective in the production of a well-shaped configuration of a drilled hole. More specifically, an object of the invention is to provide backer compositions which shape the hole properly, and leave the minimum recast layer and minimum backer residue inside the drilled hole.

According to the invention, a backer material is comprised of a binder and a glass particulate; the glass particulate contains at least a 7 weight percent of a low temperature constituent in combination with a balance of a high temperature constituent. The low temperature constituent converts in part to a gas while the high temperature constituent converts predominately to liquid, when the particulates contained within the backer is impinged upon by a drilling type of energy beam, such as an electron beam. If there is less than about 7 percent low temperature constituent, then the recast layer and glassy appearing residue within the drilled hole will be in excess.

For use with nickel base alloys, the low temperature constituent of the glass particulate has a vapor pressure greater than 1 atmosphere at a temperature less than about 2000° C. while the high temperature constituent has a melting point of more than about 1500° C. Desirably the glass has a softening point of greater than 700° C., preferably greater than 800° C., and more preferably 800°–1000° C. A useful glass of the invention will have a viscosity of the order of 10 Pa·s (1 Pa·s = 10 poise) or greater when it melts, in contrast to the lower viscosities of molten crystal ceramics such as alumina.

In the preferred oxide glasses, the high temperature constituents include silica, alumina, magnesia, calcia, and baria; the low temperature constituents include sodium oxide and boric oxide. Preferably the glass will be a silicate and contain calcia and boric oxide; the better glasses will contain by weight percent at least $8Al_2O_3$, $4MgO$, $9CaO$ and $3B_2O_3$.

The glass particulates of the inventive backers may be used in combination with a variety of binders taught by the prior art, as the binders' function is primarily to hold the glass particulate in place. The binder contributes relatively little to the hole shaping function of the backer when the glass particulates disclosed herein are utilized.

The glasses of the present invention produce considerably better hole configurations than do other ceramic materials. They can be formulated readily and do not present particular problems in use. They are applicable especially to the electron beam drilling of nickel base alloys, but also will be found useful in other beam energy processes, such as laser beam drilling, and with other composition workpieces.

The foregoing and other objects, features and advantages of the present invention will become more apparent from the following description of preferred embodiments and accompanying drawings.

BRIEF DESCRIPTION OF DRAWINGS

FIGS. 1, 1A shows in cross section a poorly formed electron beam drilled hole.

FIGS. 2, 2A shows a cross section of a well formed hole.

BEST MODE FOR CARRYING OUT THE INVENTION

Figure 3:
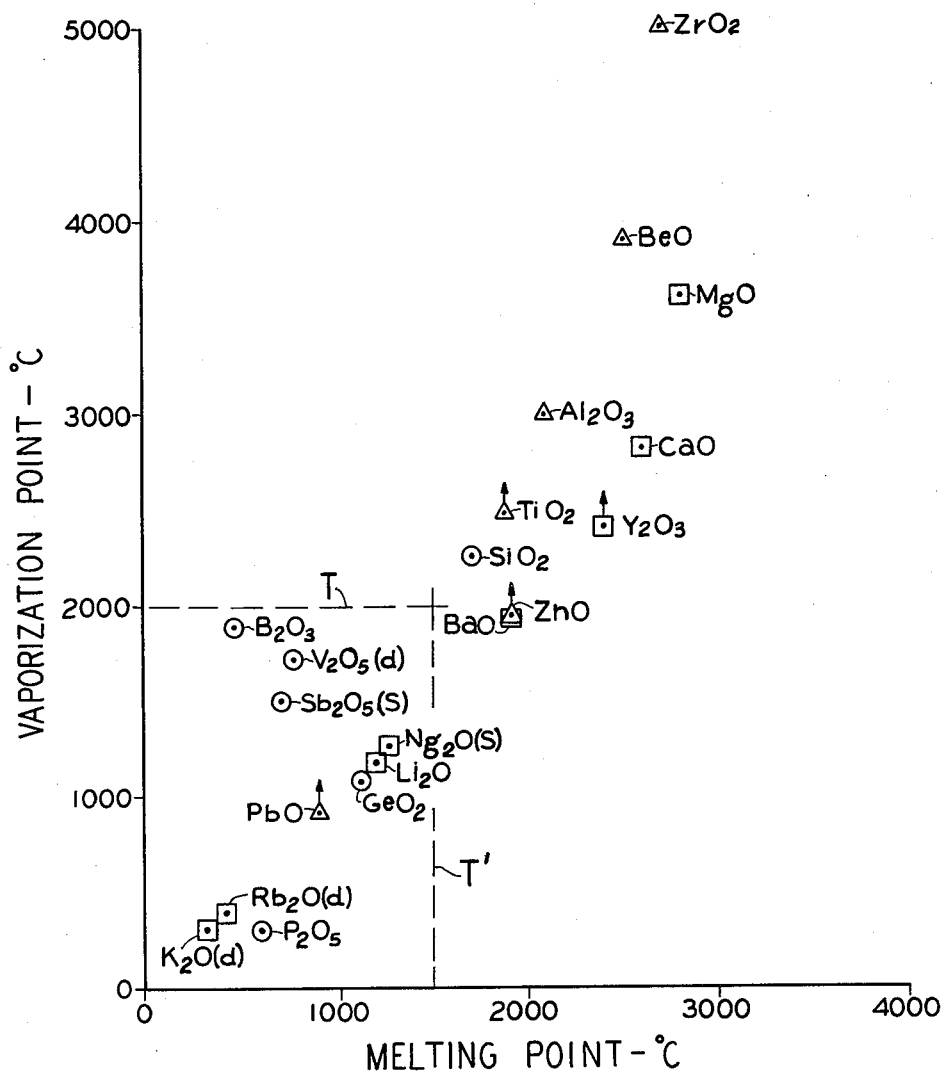
FIG. 3 is a graph showing thermal properties of glass constituents.

The preferred embodiment is described in terms of electron beam drilling of nickel base alloys but it will be found that the invention is equally useful for other materials and other energy beam drilling processes.

In the formulation of a backer, a particulate in the range of 15 to 200 microns particle size is intermixed with a binder and the combination is applied to the exit side of a workpiece. When the energy beam penetrates through the workpiece, the beam impinges on the backer and causes it to degrade. It is in this degradation process which creates the products that operate on the workpiece to help form the hole. Details regarding the manner in which backers are made from particulates and binders and applied to workpieces and generally used may be had by reference to the aforementioned U.S. Pat. No. 4,239,954, Therein also will be found the details on how holes are drilled by electron beam machines.

Test holes were drilled in a 2.5 mm thick workpiece of the cast superalloy MAR M200+Hf (9Cr, 10Co, 2Ti, 5Al, 12.5W, 1Cb 0.015B, 0.14C, 2Hf, bal Ni). The holes were about 0.5 mm in diameter. The backers were generally comprised of powders with less than 0.175 mm particle size. Particle size and distribution were briefly investigated and found to be non-critical. It is desirable to have generally a distribution of particle size so that the maximum bulk density is attained; this results in the maximum content of particulate in the backer. Table 1 shows the drilling test data for nominal particulate glass compositions shown in Table 2. Table 3 shows other glass compositions.

Drilled hole characteristics were primarily evaluated on the basis of the recast layer configuration and the amount and character of the residual material from the backer which was left in the hole. FIGS. 1, 1A illustrate in cross section a poorly formed hole 20 in a workpiece 22 made with a poorly performing backer placed at the beam exit 24 surface. It is seen that the hole 20 has an irregular shape and a substantial amount of recast layer 26. The recast layer is comprised of workpiece material which has melted under action of the energy beam but has not been completely expelled from the hole. Since it has been quenched very rapidly, it has an extremely fine grain size and is readily distintinguishable by metallography from the unaffected base workpiece material.

TABLE 1

Electron Beam Drilled Hole Features For Different Backers

| | Backer Composition | | Hole Characteristics | |
|---|---|---|---|---|
| | Matrix | Bond | Recast Layer | Ceramic Phase |
| A. | Soda lime glass | sodium silicate | very thin, even | present |
| B. | Soda lime glass | magnesium chromate | very thin, even | " |
| C. | Zirconia | magnesium chromate | thick, uneven | " |
| D. | Alumina | magnesium chromate | " | " |
| E. | 50 Pyrex-50 Alumina | magnesium chromate | thin, even | " |
| F. | E glass | magnesium chromate | " | " |
| G. | Vycor glass | magnesium chromate | thick, uneven | " |
| H. | Fused silica | magnesium chromate | " | " |
| I. | Pyrex glass | magnesium chromate | thin, even | " |
| J. | E glass | polyvinyl alcohol | " | " |
| K. | GS-302 glass | polyvinyl alcohol | very thin, even | " |
| L. | Calcium Carbonate | Magnesium Chromate | thick, even | none |

TABLE 2

Compositions of Glasses

| Glass | Softening Point - °C. | Constituent Nominal Weight Percent | | | | | | |
|---|---|---|---|---|---|---|---|---|
| | | $SiO_2$ | BaO | $Al_2O_3$ | MgO | CaO | $Na_2O$ | $B_2O_3$ |
| Soda lime | 690 | 70 | | | 2.5 | 14 | 14 | |
| PYREX (Corning 7740) | 821 | 81 | | 2 | | | 4 | 13 |
| "E" (Ferro) | 846 | 54 | | 14 | 5 | 18 | 0.5 | 8 |
| GS-302 (Owens Ill.) | 850 est. | 54 | | 9 | 8 | 13 | | 16 |
| 7059 (Corning) | 844 | 49 | 25 | 11 | | | <0.5 | 15 |
| 1723 (Corning) | 908 | 57 | 6 | 15 | 7 | 10 | <1 | 4 |
| "S" (Ferro) | 970 | 65 | | 25 | 10 | | | |
| VYCOR (Corning 7913) | 1530 | 96 | | 1 | | | | 3 |
| 100% Silica (Corning 7940) | 1580 | 100 | | | | | | |

TABLE 3

Compositions of Glasses

| Glass | Softening Point - °C. | Constituent Nominal Weight Percent | | | | | | | |
|---|---|---|---|---|---|---|---|---|---|
| | | $SiO_2$ | BaO | $Al_2O_3$ | MgO | CaO | $Na_2O$ | $B_2O_3$ | Other |
| 3225 (Ferro) | — | 65 | | 8.2 | 0.2 | 0.3 | 4.4 | 22 | |

TABLE 3-continued

| | | Compositions of Glasses | | | | | | | |
|---|---|---|---|---|---|---|---|---|---|
| | Softening | | | | Constituent Nominal Weight Percent | | | | |
| Glass | Point - °C. | $SiO_2$ | BaO | $Al_2O_3$ | MgO | CaO | $Na_2O$ | $B_2O_3$ | Other |
| 3227 (Ferro) | — | 38 | | 16 | | | 14 | 29 | 4.1 $K_2O$ |
| 3291 (Ferro) | — | 45 | | 13 | 11 | 2.1 | | 29 | |
| 3289 (Ferro) | — | 49 | 27 | 5.4 | | | 5.5 | 12 | |
| 3270 (Ferro) | — | 51 | | 8.6 | | 9.4 | 8.6 | 16 | 5.5 $K_2O$ |
| 3831 (Ferro) | — | 43 | 18 | 11 | | 12 | 4.6 | | 12 $K_2O$ |
| 3493 (Ferro) | — | 45 | | 3.1 | | 4.6 | 1.5 | 13 | 31 PbO<br>2 $K_2O$ |
| 3489 (Ferro) | — | 27 | | | | 5.6 | | | 68 PbO |

Since it has been quenched, the recast layer tends to contain cracks 28. It is this aspect which makes a thick recast layer particularly undesirable since the cracks may propagate during subsequent use and cause failure of the workpiece. Also shown inside the hole is a layer 30 which is comprised of residual ceramic material from the backer. This layer is also typically cracked. In a hole formed with a poor backer, this glassy layer is thick and uneven.

In FIGS. 2, 2A a properly formed hole 20' is shown. The recast layer 26' and glassy layer are both very thin and even. It is found that if the recast layer is kept thin enough, then the aforementioned cracking does not seem to be a problem. Typically, there is always some residual ceramic phase or glassy layer in well-formed holes. This appears inherent with good backers of the invention and is not altogether undesirable.

From Table 1 it may be seen from tests A and B that soda lime glass produces good hole characteristics with both sodium silicate ($Na_2O.4SiO_2$) and magnesium chromate ($MgCrO_4.7H_2O$) binders. Zirconia and alumina (C,D) produce poor holes while test E shows the addition of soda lime glass to the alumina produces a better hole. "E" glass and Pyrex glass work well, but Vycor and fused (100%) silica do not. (Pyrex, Vycor, "E", and "S" are trade names of the companies indicated in Table 2). The use of polyvinyl alcohol in substitution for magnesium chromate, as specimens F and J show, does not make significant difference on the hole characteristics. Calcium carbonate, specimen L, uniquely did not produce a residual glassy phase when used with magnesium chromate; this is discussed further below. From the data it can be generally seen that the binder is not strongly influential on hole characteristics, compared to the particulate. Also included in the Table 2 and Table 3 and other glasses for which tests have not been conducted, but for which the degree of utility is now inferrable. To clarify statements below, it should be known that the term glass refers to a material in a non-crystalline state; that is, a solid material which lacks the long range order of atoms periodically located on a regular lattice. A glass, as the term is used herein, is a solid formed by cooling from the liquid state while showing no discontinuous change at any temperature but has become progressively rigid. The approximate melting point of a glass is characterized in accord with commercial practice, viz., the point at which the viscosity decreases to about 10 Pa·s. At temperatures beyond this it is considered as a liquid. The main distinction between a liquid and a non-crystalline solid is that a liquid adjusts rapidly to light external forces whereas a solid does not.

In the preferred practice of drilling metals with an electron beam, as described herein, oxide glasses are used. Generally, there are three categories of constituents in oxide glasses: glass formers, intermediates, and modifiers. Included in the glass former category are materials such as $SiO_2$, $B_2O_3$, $V_2O_5$, $Sb_2O_5$, $Li_2O$, $GeO_2$ and $P_2O_5$. These are materials which can readily assume a non-crystalline state. Of course, they can also exist in a crystalline state. Intermediates enter into the network of polycomponent glasses to produce useful materials; typically they have a bond strength of greater than 80 Kcal/mole. Among the intermediates are materials such as $ZrO_2$, BeO, MgO, $Al_2O_3$, $TiO_2$, ZnO, and PbO. Modifiers are characterized by having oxide bond stregths of less than 60 Kcal/mole and do not enter into the network structure of the glass. Among the modifiers are matrials which are added to the glass formers to formulate useful glasses. Referring to Table 2, it will be seen that the glasses that are of particular interest here are based on the glass former $SiO_2$; the primary intermediate is $Al_2O_3$, while the other materials are modifiers.

Referring to the tables it will be seen that the refractory crystalline materials zirconia and alumina produced poor results. They left a thick and uneven recast layer. Being crystalline, zirconia and alumina have discreet melting points. Furthermore, when molten they have a rather low viscosity, of the order of 0.1 Pa·s, a fluidity similar to that of water. Calcium carbonate also did not produce a good hole and furthermore tended to leave no significant glassy phase in the hole bore. Under the action of the beam, calcium carbonate is believed to decompose to calcia and carbon dioxide. It is seen that Vycor glass and fused silica do not work effectively, leaving in the hole thick and uneven glassy ceramic layers. Vycor and 100% silica glasses are characterized by high viscosities of the order of $10^6$ Pa·s when at about 1400° C. Generally, the best working glasses which contain an element such as Al, Mg, Ca, and Ba will have viscosities of the order of 10 $10-10^2$ Pa·s at about 1400° C., as indicated by the lower softening points of the glasses in Table 2. (Softening point is defined in American Society of Testing Material Specification ASTM C-338; as a conventional rule of thumb for the glasses herein, it is the temperature at which the viscosity becomes about $10^{6.6}$ Pa·s ($10^{7.6}$ poise)).

Therefore, it may be said that the useful glass particulates have softening points greater than 700° C.; or more specifically between 800°–1000° C. Of course softening points are not only indicators of the differences in constituents and composition, but also indicative of the high temperature properties. Glasses with the higher 800°–1000° C. softening points would appear preferred from the standpoint of the beam stopping function of the backer.

The dynamics of the backer particulates can be speculated upon from the test data. The lack of a glassy phase when using calcium carbonate and the poor hole which results leads to the conclusion that a glassy layer must be created when the backer is hit by the beam, to sweep the hole clear. When $CaCO_3$ is hit by the electron beam, it decomposes into $CO_2$ gas plus CaO powder. Since the decomposition temperature of 825° C. is so much lower than the melting point of CaO (~2575° C.), the CaO powder apparently does not melt but is blown out of the hole as solid powder particles. Thus, no glassy or quenched molten ceramic phase forms in the hole. The inability of alumina and zirconia to provide good results is attributed to their low viscosities compared to the Al-Mg-Ca-Ba-B-containing silicates; this results in an apparent inadequate entrainment of the molten metal by the backer liquid. It is concluded that the glass particulate must be such that its liquid phase has a viscosity of at least the order of 10 Pa·s.

Vycor and fused silica gave poor results, yet their viscosities are of the order of $10^6$ Pa·s. The poor results can be understood from FIG. 3 and the behavior of the better glasses. FIG. 3 is a graph which shows the relationship between the vaporization point and melting point of various oxide glass constituents, including those of the glasses used in particulates. For simplicity, materials which sublimate or decompose are plotted also, according to the "vaporization point" temperature at which they degenerate. The characteristic of interest is the generation of certain gases by the glass constituents of the particulate when hit by the beam. As explained below, this gas is best provided by a low temperature constituent. Evaluating the better glasses of Tables 1 and 2 with reference to FIG. 3, it is seen that they are comprised of high temperature and low temperature constituents. For example, "E" glass contains by weight percent, $54SiO_2$, $14Al_2O_3$, $5MgO$ and $18CaO$. These are all refractory high temperature materials with melting points greater than about 1500° C. as indicated by the line T' in FIG. 3. They also all have boiling points greater than about 2000° C. as indicated by line T in FIG. 3. "E" glass also contains 8 percent $B_2O_3$ and this is a low temperature constituent, i.e., one falling in the area bounded by lines T-T' and the axes of the graph.

Thus, of the glasses in Table 2, the oxides $SiO_2$, $Al_2O_3$, MgO, CaO, and BaO may be characterized as high temperature constituents while the oxides $Na_2O$ and $B_2O_3$ may be characterized as low temperature constituents. It can be seen that the materials which were found to be most effective, i.e., Pyrex, "E" glass, GS-302 and soda lime glass all had significant amounts, greater than 7 weight percent, of low temperature constituents.

In this perspective, the experimental results can be better understood. Fused silica and Vycor worked poorly while Pyrex worked well. But for up to 2% $Al_2O_3$, the characteristics of the high temperature constituents are comparable. The distinction is that Pyrex has 17% low temperature constituent. Thus, it is concluded that Vycor and fused silica are ineffective because of insufficient low temperature constituent. Enough of the easily vaporized low temperature constituent must be present to impel the liquid high temperature constituent effectively through the hole. On this basis, "S" glass can be deemed poor and avoided, even though the viscosity and softening point criteria are met. Because 1723 has only about 4 percent low temperature constituent it is predicted to be of lesser utility even though the high temperature constituent viscosity is favorable. Glass 7059 is predicted as useful based on its 15% $B_2O_3$ low temperature constituent.

Noting the utility of specimen E which was an admixture of a low melting point glass and a high melting point crystal, and based on general analytical considerations it may be concluded that the high temperature constituent can contain a solid phase; that is, the particulate glass may only partially convert to a liquid, provided the liquid-solid phase product has a viscosity which is within the set forth desired range, namely about 10 Pa·s or greater.

Referring to the glasses in Table 3 it may be predicted that they will on the whole be useful, having substantial low temperature constituents. Potential exceptions may be 3493 and 3489, having low temperature constituents of about 46-68 percent, because they may have inadequate high temperature constituent, the minimal limit for which has not been determined.

Figure 4:
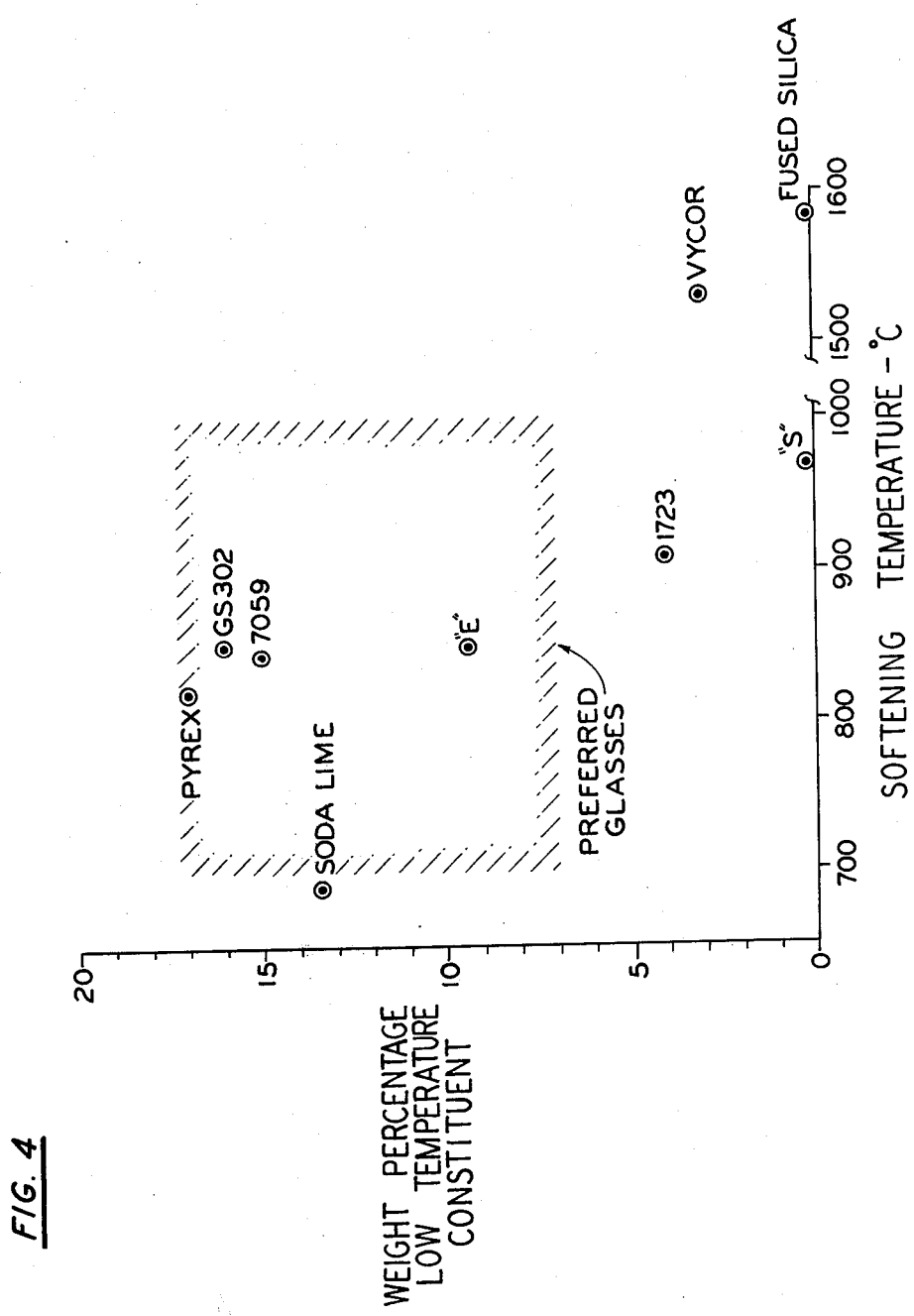
FIG. 4 graphically illustrates preferred glass particulate properties.

FIG. 4 graphically summarizes the preferred glass characteristics. A low temperature constituent of at least 7%, more preferably between 13-17%; a softening point greater than 700° C., preferably greater than 800° C.; more preferrably between 800°-1000° C. A further distinction may be made with respect to the useful glasses. Referring again to Table 2 it is seen that in distinction to Pyrex and soda lime glass, the higher temperature GS-302, 7059, and 1723 glasses all have compositions which by weight percent contain more than about $8Al_2O_3$, 9Cao, and $3B_2O_3$. Also in distinction to "S", Vycor and fused silica, these glasses contain significant CaO and $B_2O_3$. Thus, the inventive glasses may be chemically distinguished as having CaO and $B_2O_3$, both generally and according to the foregoing weight percents.

The invention has been described in terms of the use of oxide glasses with metals. However, there are other types of glasses, such as those based on $BeF_2$, $PO_4$, sulfides, and hydrogen bonded structures. It is believed the principles disclosed herein which enable good energy beam formed holes to be produced can be useful in other applications with non-silicate or non-oxide glasses.

Although this invention has been shown and described with respect to a preferred embodiment, it will be understood by those skilled in the art that various changes in form and detail thereof may be made without departing from the spirit and scope of the claimed invention.

I claim:

1. In energy beam drilling, such as electron beam drilling, of uniformly shaped holes in a metal workpiece with the use of a backer containing ceramic particulate and a binder in contact with the exit surface of the workpiece, the improvement which comprises using a backer containing a glass particulate having a softening temperature greater than 700° C. and at least 7 weight percent of a low temperature constituent together with a high temperature constituent, the low temperature constituent converting at least in part to a gas and the high temperature constituent converting at least in part to a liquid during drilling.

2. The method of claim 1 characterized by the low temperature constituent converting at least in part to a gas at a temperature less than about 2000° C. at atmospheric pressure, and the high temperature constituent converting at least in part to a liquid at a temperature greater than about 1500° C.

3. The method of claim 1 characterized by a backer having a 13-17% low temperature constituent.

4. The method of claim 1 characterized by a glass particulate comprised of a silicate.

5. The method of claim 1 characterized by a particulate having a softening point greater than 800° C.

6. The method of claim 5 characterized by a particulate having a softening point between 800°-1000° C.

7. The method of claims 1 or 2 characterized by a glass particulate having a liquid viscosity of the order of 10 Pa·s at about 1400° C.

8. The method of claim 1 characterized by the high temperature constituent being an oxide of an element selected from the group consisting of Mg, Al, Ca, Si, Ba and mixtures thereof and the low temperature constituent being an oxide of an element selected from the group consisting of B, Na, Li, Pb and mixtures thereof.

9. The method of claim 8 wherein the glass particulate contains the oxide glasses CaO and $B_2O_3$.

10. The method of claim 8 wherein the glass particulate contains by weight percent at least about $8Al_2O_3$, 9CaO, and $3B_2O_3$.

* * * * *